UNITED STATES PATENT OFFICE.

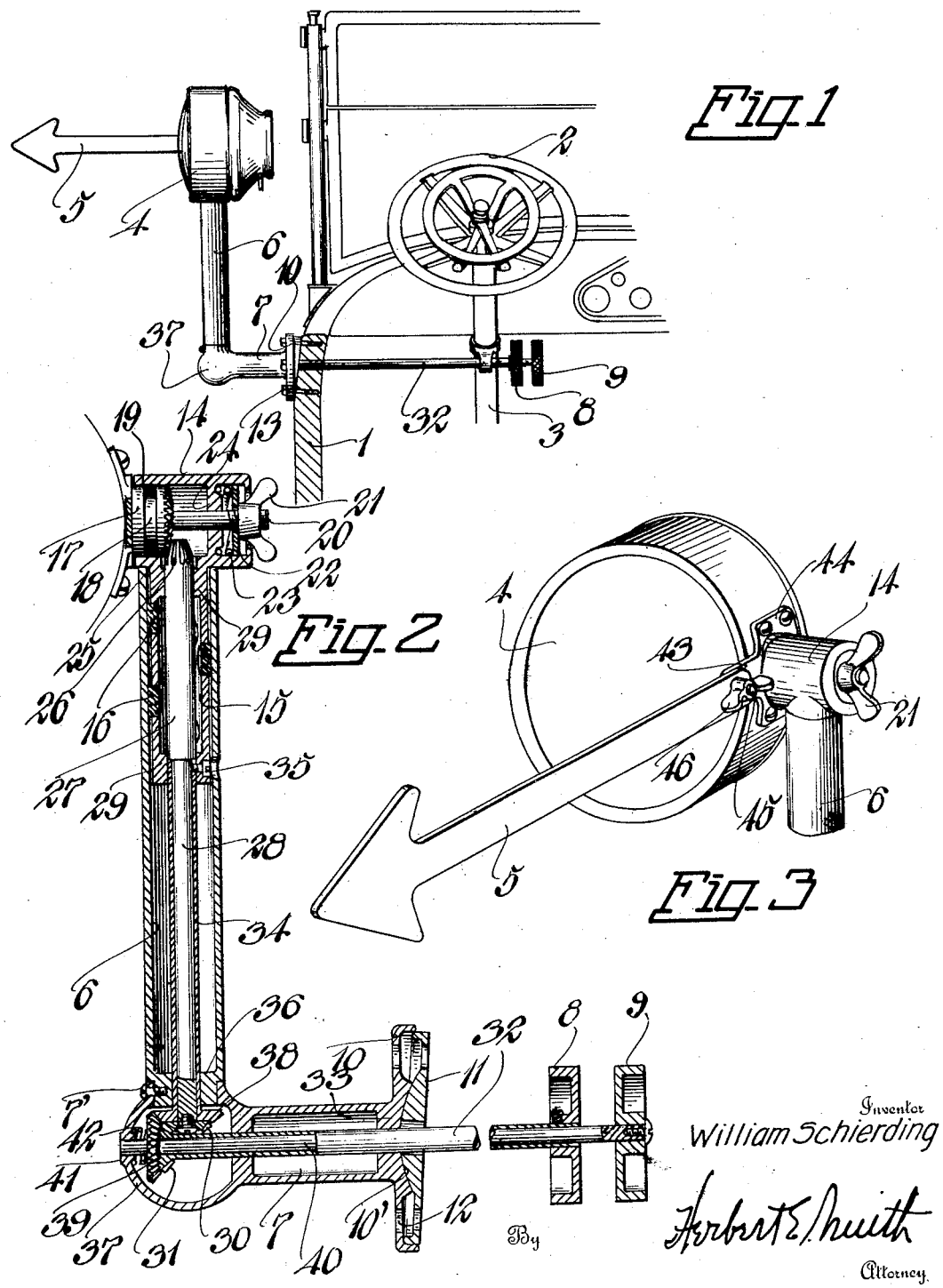

WILLIAM SCHIERDING, OF SPOKANE, WASHINGTON, ASSIGNOR TO UNIVERSAL UTILITIES MANUFACTURING COMPANY, OF SPOKANE, WASHINGTON.

VEHICLE SPOTLIGHT AND SIGNAL.

1,408,476.  Specification of Letters Patent.  Patented Mar. 7, 1922.

Application filed January 27, 1921. Serial No. 440,272.

*To all whom it may concern:*

Be it known that I, WILLIAM SCHIERDING, a citizen of Germany, (first and second papers being taken out to become citizen of the United States,) residing at Spokane, in Spokane County and State of Washington, have invented certain new and useful Improvements in Vehicle Spotlights and Signals, of which the following is a specification.

My present invention relates to an improved vehicle spotlight and signal adapted especially for use in connection with automotive vehicles, as a combined traffic signal to indicate direction of travel of the vehicle and as a spotlight for use in illuminating the roadway. The primary object of the invention is the provision of a device of this character that may readily be manipulated in either vertical or horizontal planes for bringing the lamp to position to shine in different directions or at different angles when required, together with the signal or indicator arm carried by the lamp in the performance of its functions.

To this end the invention consists in a compactly arranged attachment for automotive vehicles operable from a pair of hand wheels located in convenient position for use by the driver of the vehicle, and in certain novel combinations and arrangements of parts as will be hereinafter more fully described and claimed.

In the accompanying drawings I have illustrated one complete example of the physical embodiment of my invention wherein the parts are combined and arranged according to the best mode I have thus far devised for the practical application of the principles of my invention.

Figure 1 is a view looking toward the front of an automobile showing so much thereof as is necessary to illustrate the application thereto of my invention, the lamp and signal arm being directed in lateral or transverse position with relation to the direction of travel of the vehicle.

Figure 2 is an enlarged, vertical sectional view showing in detail the operating parts of the device for moving the lamp in vertical and horizontal planes.

Figure 3 is a perspective view of the lamp and signal arm as seen from the front thereof.

In order to show the relationship of the assembled attachment to the automobile I have designated 1 as the side of the automobile in Figure 1 and illustrated the steering wheel 2 and its post 3, as essential to the attachment and support of the lamp and signal arm.

The lamp 4 is of the usual type electric lamp employed as a spotlight and is illumined as usual from a lighting system not shown, while the signal arm 5 carried by the lamp is the conventional form of arrow for pointing in the direction of intended travel.

The lamp is supported from the side of the car body by means of a hollow, metallic standard 6 fashioned with a horizontally disposed base 7, also of metal and hollow, the parts being secured in angular position by means of screws as 7' in Figure 2 to form a rigid structure for the supporting of the lamp and its operating parts.

The combined lamp and signal are capable of adjustment in vertical and horizontal planes through the manipulation of the respective hand wheels 8 and 9 located adjacent the steering post and wheel in convenient and accessible position for the driver of the car.

To adapt the attachment to the rounded or curved sides of a car I utilize a circular, flanged attaching plate 10 in combination with the hemispherical or rounded disk 11 seated in the rounded or concave portion 10' of the plate 10, and these elements are provided with perforations 12 for screws or bolts 13 passed therethrough and secured to the car. By proper adjustment of the flanged plate, which it will be noted is integral with the base 7, over the convex disk, the base 7 and standard 6 may be arranged in true horizontal and vertical or perpendicular position as a rigid supporting structure for the movable parts of the attachment.

The lamp is directly supported in a horizontal, hollow bracket 14, which is fashioned with a depending, integral sleeve 15 fitting neatly in the upper open end of the standard 6, and may be provided with cork friction rings 16 or disks to engage the inner wall of the hollow standard and prevent rattling of the parts. An integral bracket head 17 on the lamp is located in and closes the open end of the cylindrical bracket 14 and the bracket head is fashioned with an annular, exterior groove 18 for the washer 19 which is interposed therein to prevent egress of dust to the standard and housing and also to prevent rattling of the bracket head in the bracket.

For retaining the lamp by its head in the bracket, I employ a stem 20 which extends through the cylindrical bracket, and its free threaded end is equipped with a wing or adjusting nut 21 bearing against a washer 22 within the open end of the bracket, and a cushion spring 23 is interposed between this movable washer and the fixed, transverse integral partition 24 in the cylindrical bracket in order that the nut may be turned to draw the bracket head of the lamp within the bracket. The spring retains the parts in proper position by frictional contact with the washer and partition, and while the lamp is thus held against longitudinal movement with relation to the bracket, it may be revolved or rotated in a vertical plane with relation to the bracket, by turning the hand wheel 8.

The bracket head 17, as seen in Figure 2 is fashioned with a toothed end or bevel gear 25 in position for engagement with a complementary pinion 26 formed at the upper end of the sleeve 27 rigid with and rotatable with the vertically disposed countershaft 28, which is supported, as in bearings 29 in the sleeve 15 of the lamp bracket. At its lower end the countershaft made up of the sections 27—28, is provided with a small bevel gear 30, secured as by a screw to the end of the section 28, and this bevel gear meshes with a complementary bevel gear 31 on the tubular shaft 32 having a bearing in the attaching plate 10 at 33. The hand wheel 8 is attached to the tubular shaft 32, and it will readily be apparent that by turning the hand wheel the lamp may be tilted or swung in a vertical plane, whether pointing to the front, rear or side of the car.

As before stated the hand wheel 9 is utilized to swing the lamp and its signal in a horizontal plane, and this movement is accomplished by rotating the bracket 14, the lamp and the sleeve 15, the latter within the standard. At its lower end within the standard, the sleeve has attached thereto a vertical, tubular shaft 34 which encases the countershaft section 28 and extends a short distance within the bore of the sleeve 15 to which it is secured by a screw 35. The tubular shaft 34 has a bearing in the bearing ring 36 of the spherical, hollow head 37 of the base arm 7 and the countershaft and tubular shaft are rotatably supported within the standard by the sleeve 15 at the upper end of the standard. At its lower end the vertical tubular shaft 34 is provided with a large bevel gear 38 which meshes with a complementary gear 39 fixed on the solid shaft 40 to which the hand wheel 9 is fixed. The solid shaft 40 is encased within the horizontal tubular shaft 32, passes through the gears 31 and 39 and has a bearing at 41 in the spherical head 37, and a spring 42 is interposed between the gear 39 and this bearing to hold the gears 31 and 39 in mesh with their respective and complementary gears 30 and 38, as seen in Figure 2. Now by turning the hand wheel 9 the tubular shaft 34 and fixed sleeve 15 with the bracket, bracket head and lamp may be revolved, horizontally with relation to the standard to swing the lamp and signal to desired position.

The signal arm or arrow 5 is attached to the lamp by means of the signal bracket 43 which is integral with the flange 44 by means of which the bracket 14 is attached to the lamp as best seen in Figure 3, and the signal arm or arrow is adjustable on the signal bracket by means of a threaded stud 45 projecting from the bracket 43 and passed through an opening in the end of the arm. By means of the wing nut 46 on this threaded stud the arm may be secured in adjusted position in manner well understood.

The attachment is usually supported from the side of the car adjacent to the windshield, and the several parts of the device are protected from the weather by the utilization of the hollow standard and arm, while the joints are so arranged as to exclude dust, dirt, or water, and also constructed to prevent rattling or vibration of parts. The lamp is held in adjusted position by the frictional contact of parts, as the spring 23 with washer 22 and partition 24, and the sleeve 15 with its cork disks in close contact with the inner face of the wall of the cylindrical hollow standard.

The lamp and arrow may be adjusted to meet traffic regulations of different States or divisions, and for ordinary use, the lamp may be turned down and the arrow re-set or adjusted in horizontal position at an angle to the plane of the lamp lens rendering the signal available for use. The left, right, and stop indications may be made with the arrow either by day or when illuminated by the lamp at night, by turning the hand wheel 8 while the arrow is pointing in a generally lateral direction, and of course the lamp may be turned to the front or rear and to intermediate angles within a radius around the lamp support, for customary use. Both wheels 8 and 9 may be manipulated simultaneously to give the lamp and arrow a combined vertical and horizontal swing, or the wheels may be manipulated separately to accomplish the independent movements.

From the above description taken in connection with my drawings it is apparent that I have provided a comparatively inexpensive, but compactly arranged device which may be manipulated with facility and convenience when required for performing its required functions, and which withal is a comparatively perfect mechanism for carrying out the objects and purposes of my invention.

Having thus fully described my invention what I claim as new and desire to secure by Letters Patent is—

1. The combination with the angular, hollow supporting structure, of a lamp, a tubular bracket, a lamp bracket head rotatable in said bracket and means for rotating said head to swing the lamp in a vertical plane, a stem on the bracket head having a bearing in a portion of said bracket, and means on said stem for retaining the head in operative position within the bracket.

2. The combination with the hollow supporting structure, of a bracket supported therein, a lamp oscillatable in a vertical plane and provided with a bracket head in said bracket, means for oscillating the lamp and head, a stem on the head having a threaded free end, a bearing in a portion of said bracket, a washer on the stem and a nut co-acting with the washer, and a cushion spring between said washer and bearing portion of the bracket for the purpose described.

3. The combination with a hollow standard of a rotatable sleeve therein and a hollow transverse bracket on said sleeve, means for rotating said sleeve, a lamp bracket head within said bracket and a lamp carried thereby, means for rotating said head, and means for retaining said head and lamp with relation to the bracket.

4. The combination with an angular hollow standard and a transverse hollow bracket supported thereby, of a lamp having a bracket head within the bracket, a stem on the head supported in the bracket and means on said stem for retaining the lamp and head with relation to the bracket, a bevel gear on said head, a countershaft having a bevel pinion in engagement with said gear, an actuating shaft and gears connecting said shaft with the countershaft, and a hand wheel for turning said actuating shaft.

5. The combination with an angular hollow standard of a rotatable sleeve supported therein, a bracket on the sleeve and a lamp in said bracket, of an operating shaft in the standard attached to said sleeve, an actuating shaft disposed at right angles to said operating shaft and gear connections between said shaft, and means for rotating said actuating shaft.

6. The combination with an angular hollow standard having a concave attaching head, of a convex disk complementary thereto and means for attaching these parts in adjusted position, a lamp supported on said standard, means for swinging said lamp in a horizontal plane, and means for tilting said lamp in a vertical plane.

In testimony whereof I affix my signature.

WILLIAM SCHIERDING.